(12) United States Patent
Yamaguchi et al.

(10) Patent No.: US 6,420,805 B1
(45) Date of Patent: Jul. 16, 2002

(54) BRUSHLESS MOTOR HAVING TRANSFER DEVICE

(75) Inventors: Tadao Yamaguchi, Isesaki; Akihisa Inoue, Okabe-machi, both of (JP)

(73) Assignee: Tokyo Parts Industrial Co., Ltd., Gunma-Ken (JP)

( * ) Notice: Subject to any disclaimer, the term of this patent is extended or adjusted under 35 U.S.C. 154(b) by 0 days.

(21) Appl. No.: 09/563,848

(22) Filed: May 4, 2000

(51) Int. Cl.[7] .............................. H02K 7/14; H02K 7/10
(52) U.S. Cl. .................... 310/67 R; 310/75 R; 310/90; 310/156.12; 310/83; 310/261; 310/254
(58) Field of Search ................................. 310/261, 156, 310/67 R, 83, 75 R, 99, 90, 254

(56) References Cited

U.S. PATENT DOCUMENTS

| | | | |
|---|---|---|---|
| 5,499,753 A | * 3/1996 | Yamazaki et al. | 226/194 |
| 5,550,414 A | * 8/1996 | Sakashita et al. | 310/67 R |
| 5,721,460 A | * 2/1998 | Ushiro | 310/75 R |
| 5,760,521 A | * 6/1998 | Ushiro | 310/268 |
| 5,863,008 A | * 1/1999 | Park | 242/356 |
| 5,936,793 A | * 8/1999 | Koh et al. | 360/85 |

* cited by examiner

Primary Examiner—Burton S. Mullins
(74) Attorney, Agent, or Firm—Leydig, Voit & Mayer, Ltd.

(57) ABSTRACT

A brushless motor having a transfer device includes a rotor in which a resin transfer device is disposed at one side of a rotor case, and a magnet is disposed at the other side of the case, a support portion integral with the rotor case to prevent the resin transfer device from being separated in an axial direction and sliding in a rotational direction, a shaft supporting the rotor, a stator base where a shaft holder for supporting the shaft is disposed, and a stator having armature coils for driving the rotor. Thus, the transfer device is prevented from being separated and strength in a rotational direction can be secured by the support portion. Also, the cost and the number of installation steps is reduced.

4 Claims, 5 Drawing Sheets

BRUSHLESS MOTOR HAVING TRANSFER DEVICE

BACKGROUND OF THE INVENTION

1. Field of the Invention

The present invention relates to a brushless motor having a transfer device so that the torque output of a rotor suitable for driving a pickup of a portable mini disk apparatus can be transferred through a transfer device such as a gear.

2. Description of the Related Art

Referring to FIG. 5, in a conventional geared motor for driving a pickup of a portable mini disk apparatus, a pinion P is installed at a rotary output shaft S of a flat brushless motor M as a transfer device to transfer the increased torque output.

However, the pinion P is typically, of polyacetyl to reduce mechanical noise and must have a thickness of about 1 mm to maintain flatness. Also, to secure maintenance strength, the pinion P is pressed onto the shaft S through a brass bushing B. The installation of the brass bushing B limits making the pinion P thin and raises the cost of the pinion itself or causes difficulty in an installation process.

SUMMARY OF THE INVENTION

To solve the above problems, it is an objective of the present invention to provide a flat type brushless motor having a transfer device which is cost effective by reducing the number of parts.

Accordingly, to achieve the above objective, there is provided a brushless motor having a transfer device which comprises a rotor in which a resin transfer device is disposed at one side of a rotor case and a magnet is disposed at the other side thereof, a support portion integrally formed with the rotor case to prevent the resin transfer device from being separated in an axial direction and sliding in a rotational direction, a shaft for supporting the rotor, a stator base where a shaft holder for supporting the shaft is disposed, and a stator having a plurality of armature coils for driving the rotor.

It is preferred in the present invention that the transfer device is integrally formed with the support portion.

Also, it is preferred in the present invention that a groove through which resin passes is formed at the rotor case or the magnet and the magnet is integrally formed when the transfer device is formed.

Also, it is preferred in the present invention that the transfer device is a pinion and a concave portion is provided at the rotor case facing a gear portion of the pinion.

BRIEF DESCRIPTION OF THE DRAWINGS

The above objective and advantages of the present invention will become more apparent by describing in detail a preferred embodiment thereof with reference to the attached drawings in which.

DETAILED DESCRIPTION OF THE INVENTION

Figure 1:
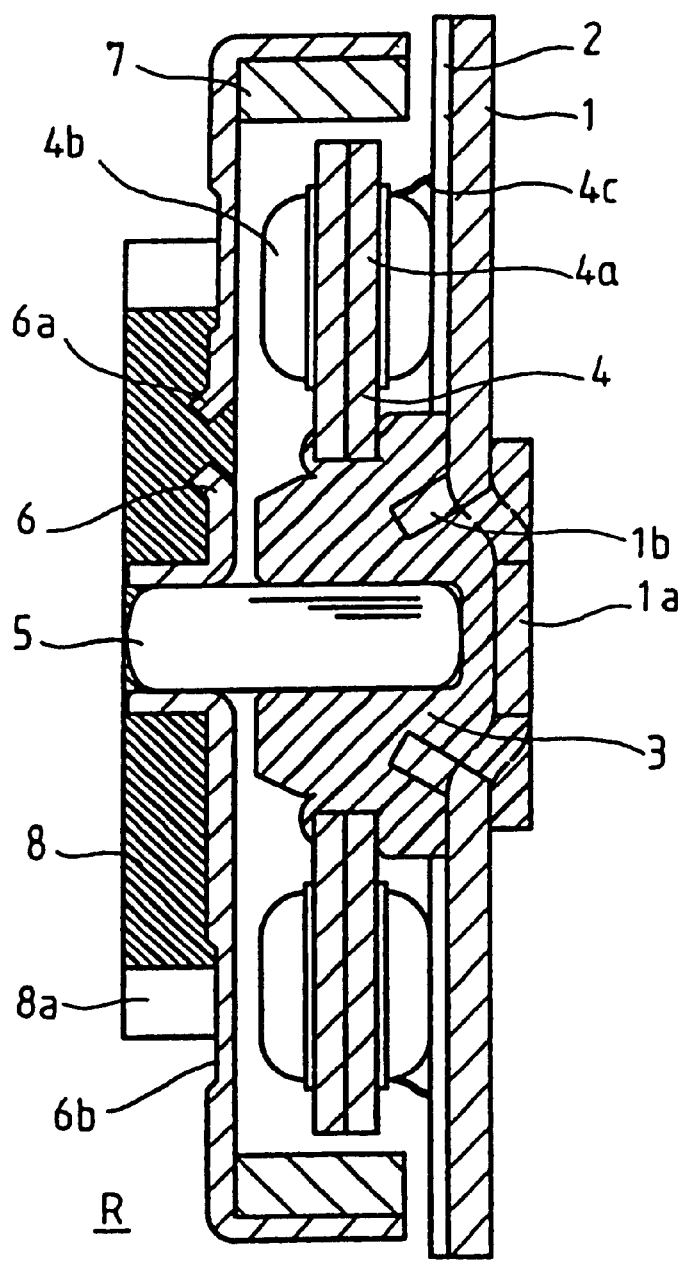
FIG. 1 is a sectional view showing the structure of a diametric direction porous core geared motor as a first preferred embodiment in a brushless motor having a transfer device of the present invention.

In FIG. 1, reference numeral 1 denotes a stator base of a relatively thin stainless plate. A circuit board 2 of polyimide or polyester is disposed on the upper surface of the stator base 1. A bridge portion 1a is located at the central portion of the stator base 1 and three support pieces 1b are arranged around the bridge portion 1a. A shaft holder 3 is provided by integrally molding a portion of the support pieces 1b of a low friction resin. A stator core 4 made by winding armature coils 4b around a plurality of protruding poles 4a is fixedly installed at the outer circumferential surface of the resin holder 3 by of adhesion or welding. An end portion 4c of each of the armature coils 4 is connected by soldering to a predetermined pattern of the circuit board 2.

A rotor R includes a shaft 5 directly inserted in the resin holder 3 for rotating, a rotor case 6 coupled by pressing and inserting the shaft 5 therein. A rubber magnet 7 has a ring shape and is installed inside the rotor case 6 by bending a plate of the rotor case 6 and fixing the rubber magnet 7 with pressure to the inner surface of the rotor case 6 to face the protruding poles 4a of the stator core 4 through a diametric direction gap. A plurality of support portions 6a for preventing separation are provided at the rotor case 6, and a pinion 8 of polyacetyl resin is integras with the support portion 6a as a torque transfer device. The rotor case 6 at a gear portion of the pinion 8 has a slightly concave portion 6b which is formed during the pressing process. When the pinion 8 is integrally formed, a mold is inserted into the concave portion 6b so that an effective length of the gear portion 8a can be secured if the mold is abraded.

Although a pinion is used as a transfer device in the present preferred embodiment, a roller made of soft rubber or a pulley can be used instead.

Figure 2:
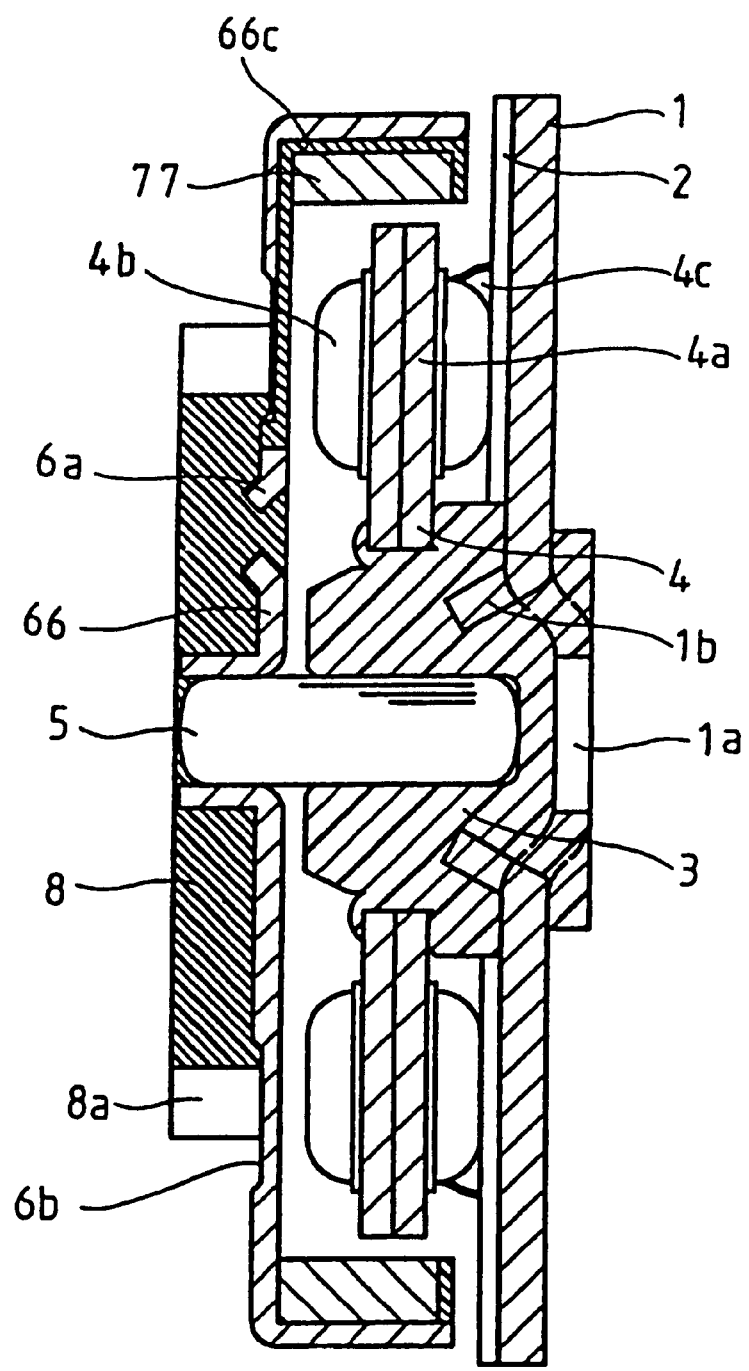
FIG. 2 is a sectional view showing major parts of the motor shown in FIG. 1 according to a second preferred embodiment of the present invention.
Figure 3:
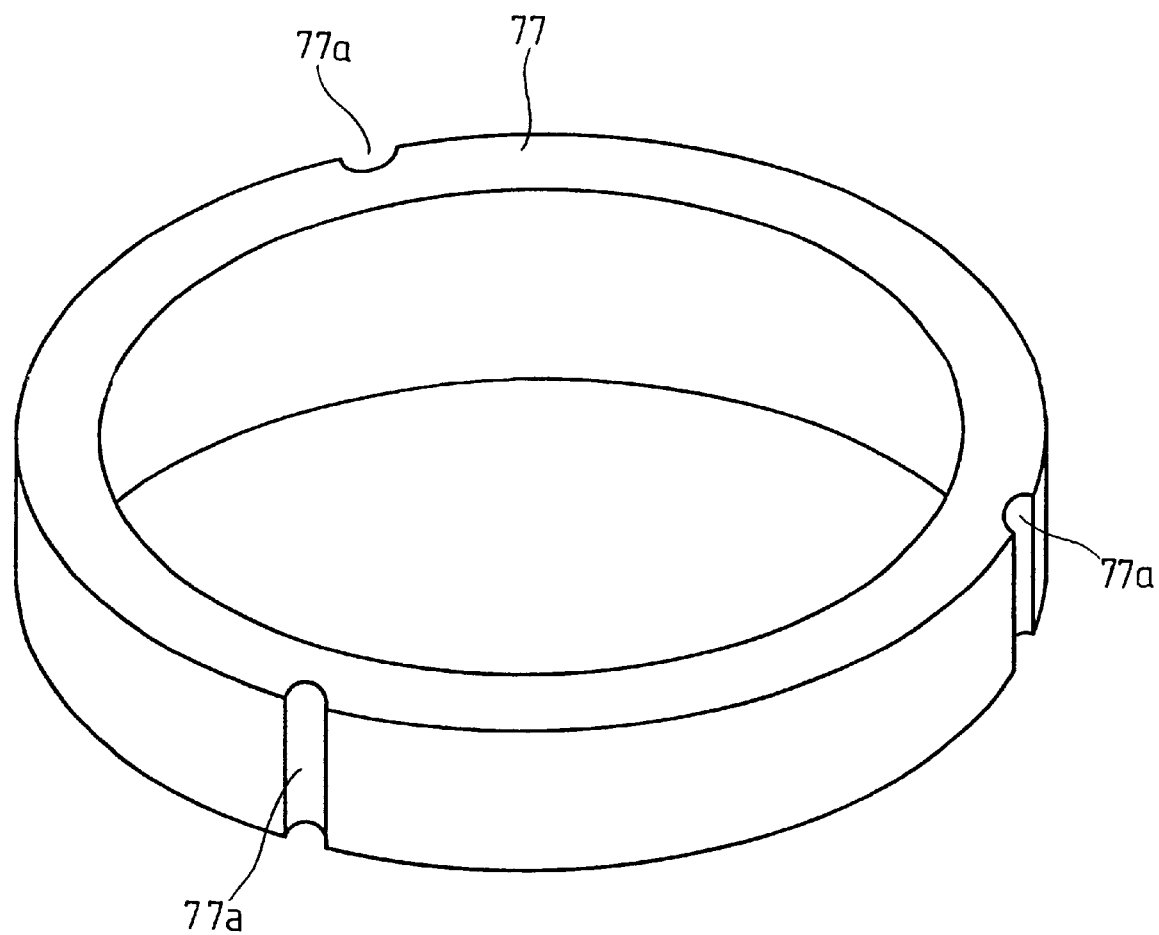
FIG. 3 is a perspective view showing a part used in the second preferred embodiment.

FIG. 2 shows major parts of the motor shown in FIG. 1 according to a second preferred embodiment of the present invention. Referring to the drawing, a through groove 66c for passing resin is provided in a rotor case 66 so that a neodymium bonded magnet 77 can be simultaneously and integrally formed when the pinion 8 is formed. In this case, the neodymium bonded magnet 77 has a transverse groove 77a for passing resin at the outer circumferential surface thereof, as shown in FIG. 3. Also, as the other members are the same as those in the first preferred embodiment, the other members are referenced with the same reference numerals and descriptions thereof will be omitted.

Although a pinion is used as the transfer device in the above preferred embodiments, a worm may be used. Also, although the stator core, which is formed of two stacked laminates, is relatively thin, it is obvious that a wide stator, i.e., a stator that is wide in the axial direction, formed of tens of stacked laminates can be adopted.

Figure 4:
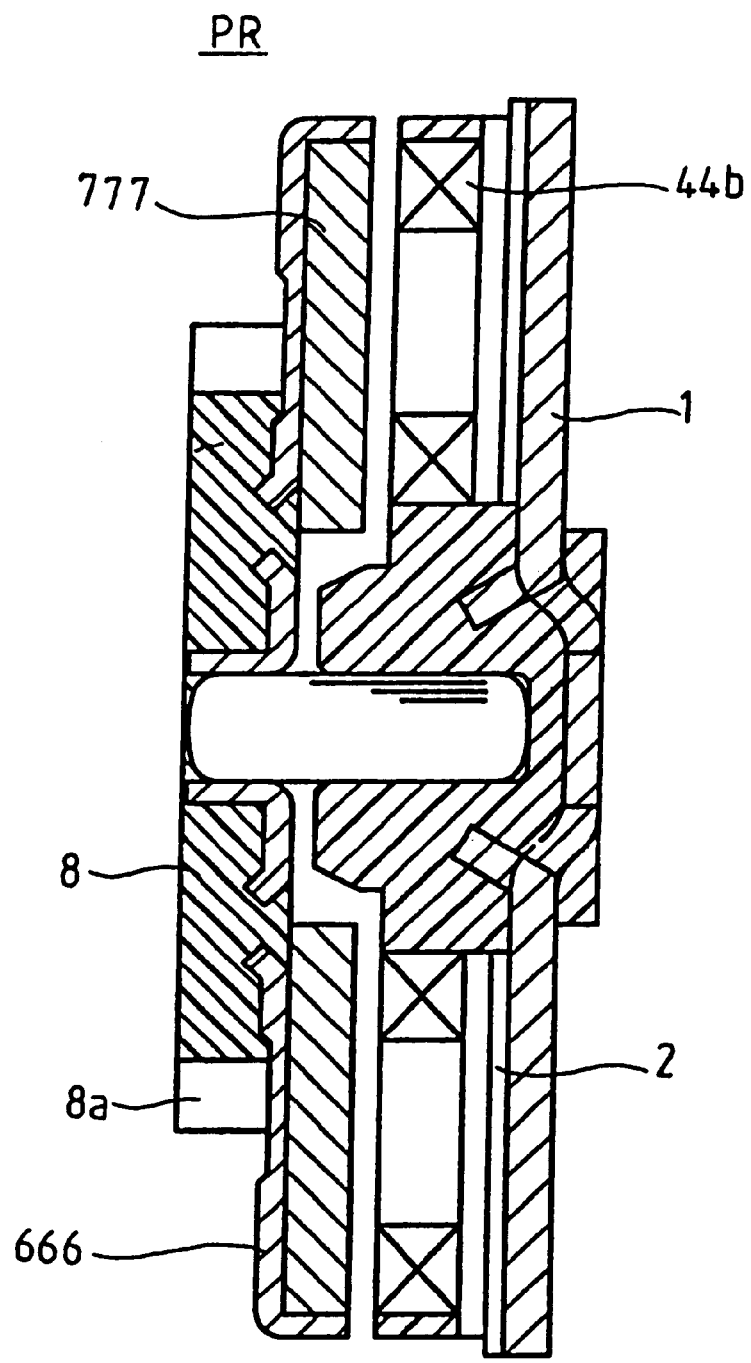
FIG. 4 is a sectional view showing major parts of an axial direction gap slotless type geared motor as a third preferred embodiment of a brushless motor having a transfer device of the present invention.
Figure 5:
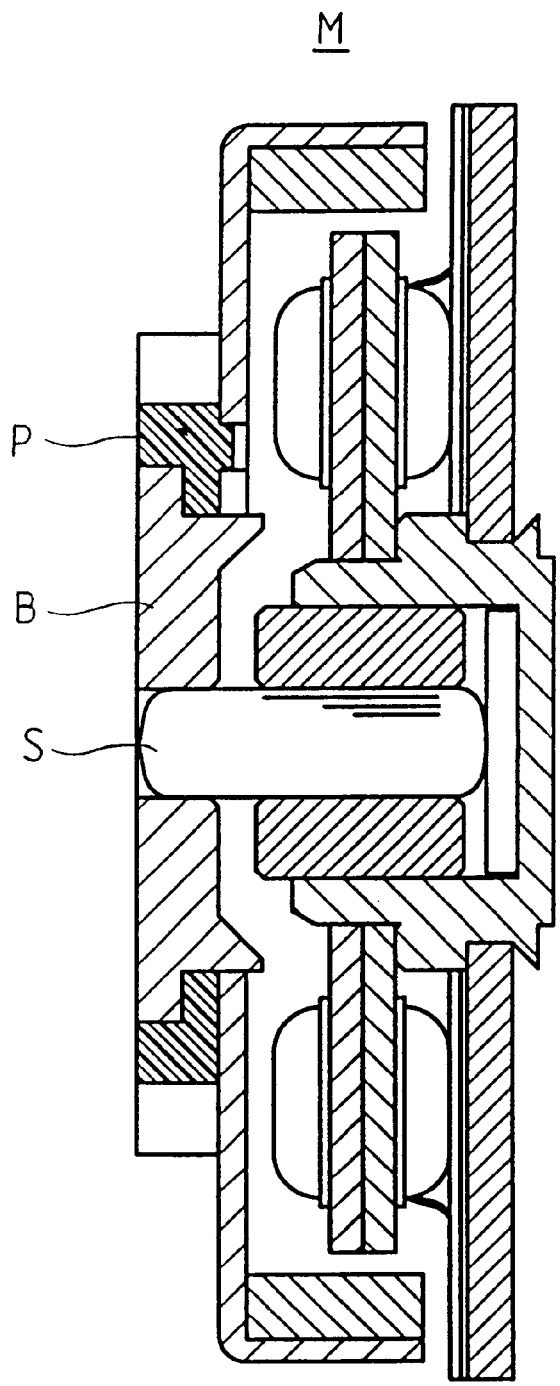
FIG. 5 is a sectional view showing the structure of a conventional diametric direction gap core geared motor.

As shown in FIG. 4, an axial direction gap slotless type geared motor can be used as a third preferred embodiment of a brushless motor having a transfer device of the present invention. In this case, a neodymium-based magnet 777 has a disk shape and is fixedly installed at the inner surface of a rotor case 666. A plurality of air-core armature coils 44b facing the magnet 777 are fixedly installed at the stator base 1 on the circuit board 2 as described above.

Since the structure of the pinion 8, which is a transfer device, is the same as that of the above-described embodiment, a description thereof referenced with the same numbers will be omitted herein.

In the present invention, when the pinion is installed at the shaft, since the pinion is integral with the rotor case, the existing problem of the maintenance of strength of the pinion does not occur and a low profile is possible. Also, as a brass bushing not needed, the cost of additional members and the number of additional installation steps is reduced.

Further, although in the above embodiments the pinion is integral with the rotor case and installed at the shaft, the same function and effect can be achieved by installing a protrusion at the pinion to be inserted in a tapered support portion of the rotor case and then welding or bending the protrusion inserted therein, thus obtaining the same structure as shown in FIG. 1. Also, although a shaft rotation motor shown in the described embodiments, it is possible to fix the shaft, so that the shaft holder is disposed at the rotor.

It is noted that the present invention is not limited to the preferred embodiment described above, and it is apparent that variations and modifications by those skilled in the art can be effected within the spirit and scope of the present invention defined in the appended claims.

What is claimed is:

1. A brushless motor having a torque transfer member, the brushless motor comprising:
   a rotor case having opposed inside and outside surfaces and a diameter, the rotor case including a concave portion in the outside surface and an integral support portion including an opening through the rotor case and oblique parts of the rotor case adjacent the opening that project outwardly from the rotor case;
   a torque transfer member disposed on the outside surface of the rotor case and having a bottom surface partly accommodated, in a thickness direction, in the concave portion of the outside surface of the rotor case, in contact with the outside surface of the rotor case, filling the opening and embedding the oblique parts of the rotor case to prevent the torque transfer member from moving in axial and radial directions during rotation of the rotor case, and having a diameter smaller than the diameter of the rotor case;
   a magnet mounted on and inside the rotor case;
   an axle supporting the rotor case;
   a resin axle holder supporting the axle;
   a stator base including opposed inside and outside surfaces, a hole directly opposite the axle, and an oblique portion adjacent the hole as a support piece;
   a bridge embedded in the resin axle holder directly opposite the axle and strengthening engagement of the stator base and the axle holder, the axle holder upstanding from the inside surface of the stator base and protruding through the hole in the stator base with the support piece embedded in the resin axle holder; and
   a stator mounted on the inside surface of the stator base and having an armature coil for rotationally driving the magnet.

2. A brushless motor having a torque transfer member, the brushless motor comprising:
   a rotor case having opposed inside and outside surfaces and a diameter, the rotor case including a concave portion in the outside surface and an integral support portion including an opening through the rotor case and oblique parts of the rotor case adjacent the opening that project outwardly from the rotor case;
   a resin torque transfer member disposed on the outside surface of the rotor case and having a bottom surface partly accommodated, in a thickness direction, in the concave portion of the outside surface of the rotor case, in contact with the outside surface of the rotor case, filling the opening and embedding the oblique parts of the rotor case to prevent the torque transfer member from moving in axial and radial directions during rotation of the rotor case, and having a diameter smaller than the diameter of the rotor case;
   a magnet mounted on and inside the rotor case and including a plurality of grooves in an outer circumferential surface through which resin passes during molding of the torque transfer member, the magnet being mounted in the rotor case with part of the resin;
   an axle supporting the rotor case;
   a resin axle holder supporting the axle;
   a stator base including opposed inside and outside surfaces, a hole directly opposite the axle, and an oblique portion adjacent the hole as a support piece;
   a bridge embedded in the resin axle holder directly opposite the axle and strengthening engagement of the stator base and the axle holder, the axle holder upstanding from the inside surface of the stator base and protruding through the hole in the stator base with the support piece embedded in the resin axle holder; and
   a stator mounted on the inside surface of the stator base and having an armature coil for rotationally driving the magnet.

3. A brushless motor having a torque transfer member, the brushless motor comprising:
   a rotor case having opposed inside and outside surfaces and a diameter, the rotor case including a concave portion in the outside surface and an integral support portion including an opening through the rotor case and oblique parts of the rotor case adjacent the opening that project outwardly from the rotor case;
   a pinion disposed on the outside surface of the rotor case and having a bottom surface partly accommodated, in a thickness direction, in the concave portion of the outside surface of the rotor case, in contact with the outside surface of the rotor case, filling the opening and embedding the oblique parts of the rotor case to prevent the pinion from moving in axial and radial directions during rotation of the rotor case, and having a diameter smaller than the diameter of the rotor case;
   a magnet mounted on and inside the rotor case;
   an axle supporting the rotor case;
   a resin axle holder supporting the axle;
   a stator base including opposed inside and outside surfaces, a hole directly opposite the axle, and an oblique portion adjacent the hole as a support piece;
   a bridge embedded in the resin axle holder directly opposite the axle and strengthening engagement of the stator base and the axle holder, the axle holder upstanding from the inside surface of the stator base and protruding through the hole in the stator base with the support piece embedded in the resin axle holder; and
   a stator mounted on the inside surface of the stator base and having an armature coil for rotationally driving the magnet.

4. A brushless motor having a torque transfer member, the brushless motor comprising:
   a rotor case having opposed inside and outside surfaces and a diameter, the rotor case including a concave portion in the outside surface and an integral support portion including an opening through the rotor case and a surface having oblique parts of the rotor case adjacent the opening that project outwardly from the rotor case;

a resin pinion disposed on the outside surface of the rotor case and having a bottom surface partly accommodated, in a thickness direction, in the concave portion of the outside surface of the rotor case, in contact with the outside surface of the rotor case, filling the opening and embedding the oblique parts of the rotor case to prevent the pinion from moving in axial and radial directions during rotation of the rotor case, and having a diameter smaller than the diameter of the rotor case;

a magnet mounted on and inside the rotor case and including a plurality of grooves in an outer circumferential surface through which resin passes during molding of the pinion, the magnet being mounted in the rotor case with part of the resin;

an axle supporting the rotor case;

a resin axle holder supporting the axle;

a stator base including opposed inside and outside surfaces, a hole directly opposite the axle, and an oblique portion adjacent the hole as a support piece;

a bridge embedded in the resin axle holder directly opposite the axle and strengthening engagement of the stator base and the axle holder, the axle holder upstanding from the inside surface of the stator base and protruding through the hole in the stator base with the support piece embedded in the resin axle holder; and a stator mounted on the inside surface of the stator base and having an armature coil for rotationally driving the magnet.

* * * * *